(12) United States Patent
Seol (10) Patent No.: US 7,980,156 B2
(45) Date of Patent: Jul. 19, 2011

(54) MULTIPURPOSE TRANSMISSION MECHANISM FOR BICYCLE WITH QUICK ASSEMBLY DEVICE

(75) Inventor: Marn Taek Seol, Kyung Gi-Do (KR)

(73) Assignee: Ok Yeo Chong, Tianjin (CN)

( * ) Notice: Subject to any disclaimer, the term of this patent is extended or adjusted under 35 U.S.C. 154(b) by 1191 days.

(21) Appl. No.: 11/705,134

(22) Filed: Feb. 12, 2007

(65) Prior Publication Data

US 2008/0190238 A1    Aug. 14, 2008

(51) Int. Cl.
*B62M 3/00*    (2006.01)
*B62J 9/00*    (2006.01)
*F16H 27/02*    (2006.01)

(52) U.S. Cl. .................. 74/594.2; 280/288.4; 74/143

(58) Field of Classification Search .............. 280/288.4, 280/293; 74/143; 474/1
See application file for complete search history.

(56) References Cited

U.S. PATENT DOCUMENTS

| 5,088,340 A | 2/1992 | Seol |
| 2005/0142437 A1* | 6/2005 | Meggiolan .................. 429/100 |

* cited by examiner

*Primary Examiner* — Thomas R Hannon
*Assistant Examiner* — Alan B Waits
(74) *Attorney, Agent, or Firm* — Muncy, Geissler, Olds & Lowe, PLLC (57) ABSTRACT

A transmission mechanism is used in a bicycle having a frame. The transmission mechanism includes a quick assembly device including a central shaft, threaded collars, and a clip bracket, which is adapted to mount to a lower frame portion of the bicycle frame and a multi-mode mechanism, which is supported and fixed by the quick assembly device to provide the bicycle with multiple modes of pedaling.

8 Claims, 8 Drawing Sheets

MULTIPURPOSE TRANSMISSION MECHANISM FOR BICYCLE WITH QUICK ASSEMBLY DEVICE

BACKGROUND OF THE INVENTION

1. Field of the Invention

The present invention relates to a multipurpose transmission mechanism for a bicycle, and in particular to a transmission mechanism comprising a clip bracket that can be easily mounted to the bicycle frame to couple a multi-mode mechanism to the bicycle frame.

2. The Related Arts

Bicycles equipped with a gear-shifting mechanism are available in the market. The gear-shifting mechanism functions to switch the operation of the bicycle among different sprockets of different speed ratios. Besides switching among different sprockets of different speed ratios, the conventional gear-shifting mechanism does not function to alert operation mode of the bicycle. This makes it only possible to exercise particular muscles in riding the bicycle. Further, a single, fixed operation mode also makes long term riding boring.

Thus, U.S. Pat. No. 5,088,340, entitled "Multipurpose Transmission Mechanism for Bicycles", filed by the present inventor discloses a bicycle of which the operation mode can be changed. In other words, besides the conventional operation of continuous rotation of the pedals, other operation modes, including leverage mode and independent pedaling mode, are also available. Such variety of operation modes allows a bicycle rider to select the most suitable mode for riding and exercising. Such a transmission mechanism is also applicable to stationary bicycles.

However, the conventional multipurpose suffers some drawbacks:

(A) The bicycle disclosed in U.S. Pat. No. 5,088,340 requires a particular-purpose hub mounted in a rear wheel in order to allow the bicycle to carry out leverage mode operation and the particular-purpose hub is of high manufacturing costs as compared to regular hubs.

(B) The rear wheel hub of the bicycle disclosed in U.S. Pat. No. 5,088,340 is of heavy weight, which makes it difficult to operate for certain users.

(C) The multipurpose transmission mechanism of the bicycle disclosed in U.S. Pat. No. 5,088,340 is easy to malfunction.

In view of the drawbacks, the present inventor teaches in U.S. patent application Ser. No. 11/281,470, entitled "Improved Multifunctional Pedaling Motion Bicycle" a bicycle transmission mechanism that effectively overcomes the drawbacks discussed above. However, the known transmission mechanism must work with a particular-purpose bicycle frame. Since it does not work with regular bicycle frame, it is difficult to get popularized. In addition, it is not possible for general consumers to do assembling by themselves.

Thus, it is desired to further improve the bicycle transmission mechanism to allow easy and quick assembling and compatible wit the conventional bicycle frames.

SUMMARY OF THE INVENTION

An object of the present invention is to provide a multipurpose transmission mechanism for a bicycle, which comprises a quick assembly device that allows quick assembling of a multi-mode mechanism to a regular bicycle frame so that a regular bicycle is provided with a clutch-based control mechanism that selectively allows pedal cranks of the bicycle to carry out a variety of pedaling modes, including the conventional alternate pedaling operation, synchronous and same-direction up and down pedaling operation, rotary pedaling, both side alternate up-and-down pedaling, and single side up-and-down pedaling. In addition, assembling the transmission mechanism to a bicycle frame is easy, requiring no service of professional mechanics. Further, the transmission mechanism can be applied to regular bicycle frames. Thus, the present invention realizes utilization and low costs and can be popularized to be applied to all kinds of bicycles.

The present invention has the following advantages:

(1) While the conventional transmission mechanisms need parts of particular designs, the present invention allows for easy assembling by using a quick assembly device. The quick assembly device functions to support a multi-mode mechanism. With such an arrangement, even a regular bicycle frame can function as a multi-mode bicycle and can be assembled in an efficient manner.

(2) The conventional transmission mechanism must be installed by professional mechanics. This increases the manufacturing costs and makes popularization difficult. The present invention, however, can be assembled by the general consumers. Thus, popularization can be effectively achieved.

To realize the above object, in accordance with the present invention, a transmission mechanism for a bicycle having a frame is provided, wherein the transmission mechanism comprises a quick assembly device comprising a central shaft, threaded collars, and a clip bracket, which is adapted to mount to a lower frame portion of the bicycle frame and a multi-mode mechanism, which is supported and fixed by the quick assembly device to provide the bicycle with multiple modes of pedaling.

BRIEF DESCRIPTION OF THE DRAWINGS

The present invention will be apparent to those skilled in the art by reading the following description of a preferred embodiment thereof, with reference to the attached drawings, wherein:

FIG. 8A is a side elevational view illustrating a further pedaling mode of the present invention.

DETAILED DESCRIPTION OF THE PREFERRED EMBODIMENT

Figure 1:
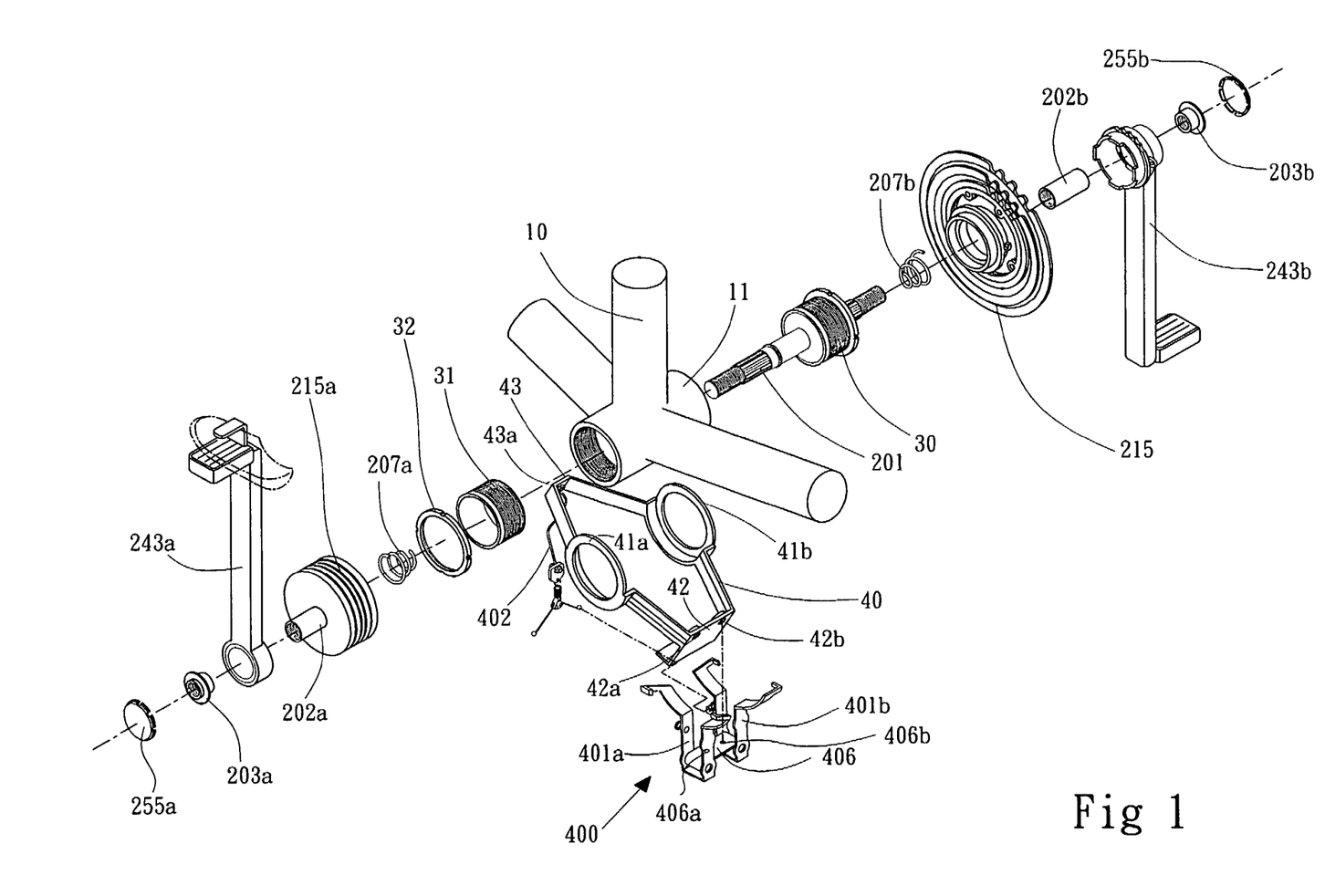
FIG. 1 is an exploded view of a multipurpose transmission mechanism constructed in accordance with the present invention.
Figure 2:
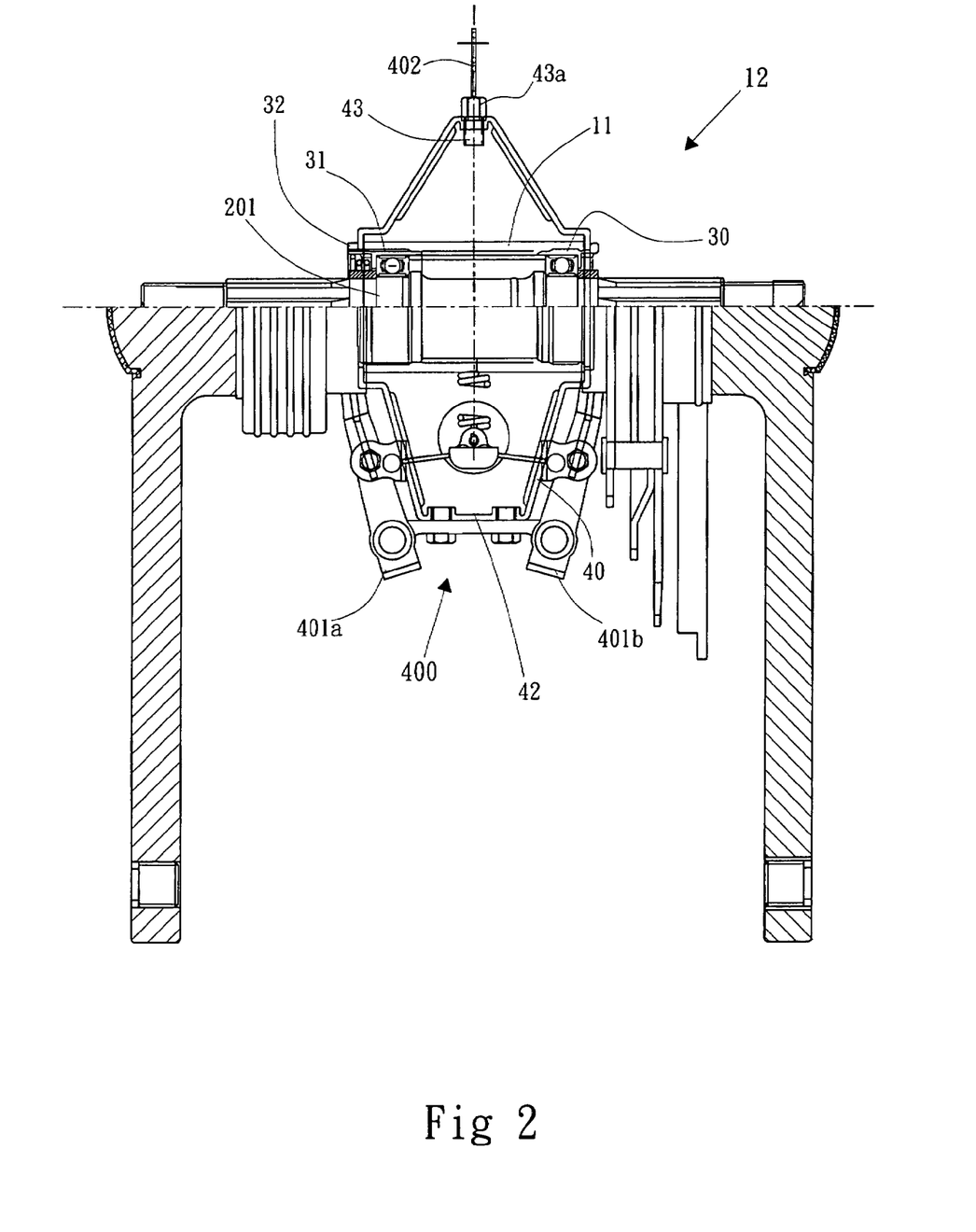
FIG. 2 is a cross-sectional view of a multipurpose transmission mechanism constructed in accordance with the present invention in an assembled condition.

With reference to the drawings and in particular to FIGS. 1 and 2, which are an exploded view and a cross-sectional view, in an assembled condition, of a multipurpose transmission mechanism constructed in accordance with the present invention, the transmission mechanism is incorporated in a bicycle for switching the operation of the bicycle among different modes. The transmission mechanism comprises a quick assembly device 12 and a multi-mode mechanism 200. The quick assembly device 12 comprises a central shaft 201, threaded collars 30, 31, and a clip bracket 40.

The transmission mechanism of the present invention is mounted to a lower frame portion 11 of a frame 10 of a regular bicycle or a stationary bicycle. To mount the transmission mechanism, retention rings 41a, 41b of the clip bracket 40 are positioned in alignment with a bore (not labeled) of the lower frame portion 11 of the bicycle frame 10. The central shaft 201 of the quick assembly device 12, with the threaded collar 30, which has bearing accommodated therein, mounted thereon in advance as shown in FIG. 1, is then inserted through both the retention rings 41a, 41b of the clip bracket 40 and the lower frame portion 11 of the bicycle frame 10. After the central shaft 201 extends through the retention ring 41a, 41b of the clip bracket 40 and the lower frame portion 11 of the bicycle frame 10, the threaded collar 31, which has bearing accommodated therein, is fit over and mounted to an opposite ends of the central shaft 201. A fixing ring 32 is then fit over and mounted to an outer end section of the threaded collars 30, 31 to "quickly" secure the retention rings 41a, 41b in position. The opposite ends of the central shaft 201 are then fit through resilient elements 207a, 207b, inner-threaded retention tubes 202a, 202b of driving sprocket means 215 and gear-shifting means 215a, pedal cranks 243a, 243b, locking members 203a, 203b, and caps 255a, 255b.

Clips 401a, 401b are arranged outside the lower frame portion 11 of the bicycle frame 10 at locations corresponding to the clip bracket 40. The retention rings 41a, 41b of the clip bracket 40 have downward extensions forming therebetween a rear support block 42 which defines inner-threaded holes 42a, 42b and also have upward extensions forming therebetween a front support block 43, which defines an inner-threaded hole 43a. The clips 401a, 401b, which constitute a control mechanism 400, comprises a support block 406 that is attached to the clip bracket 40. A control cable 402 has lower branches (not labeled) respectively secured to the clips 401a, 401b.

Figure 3:
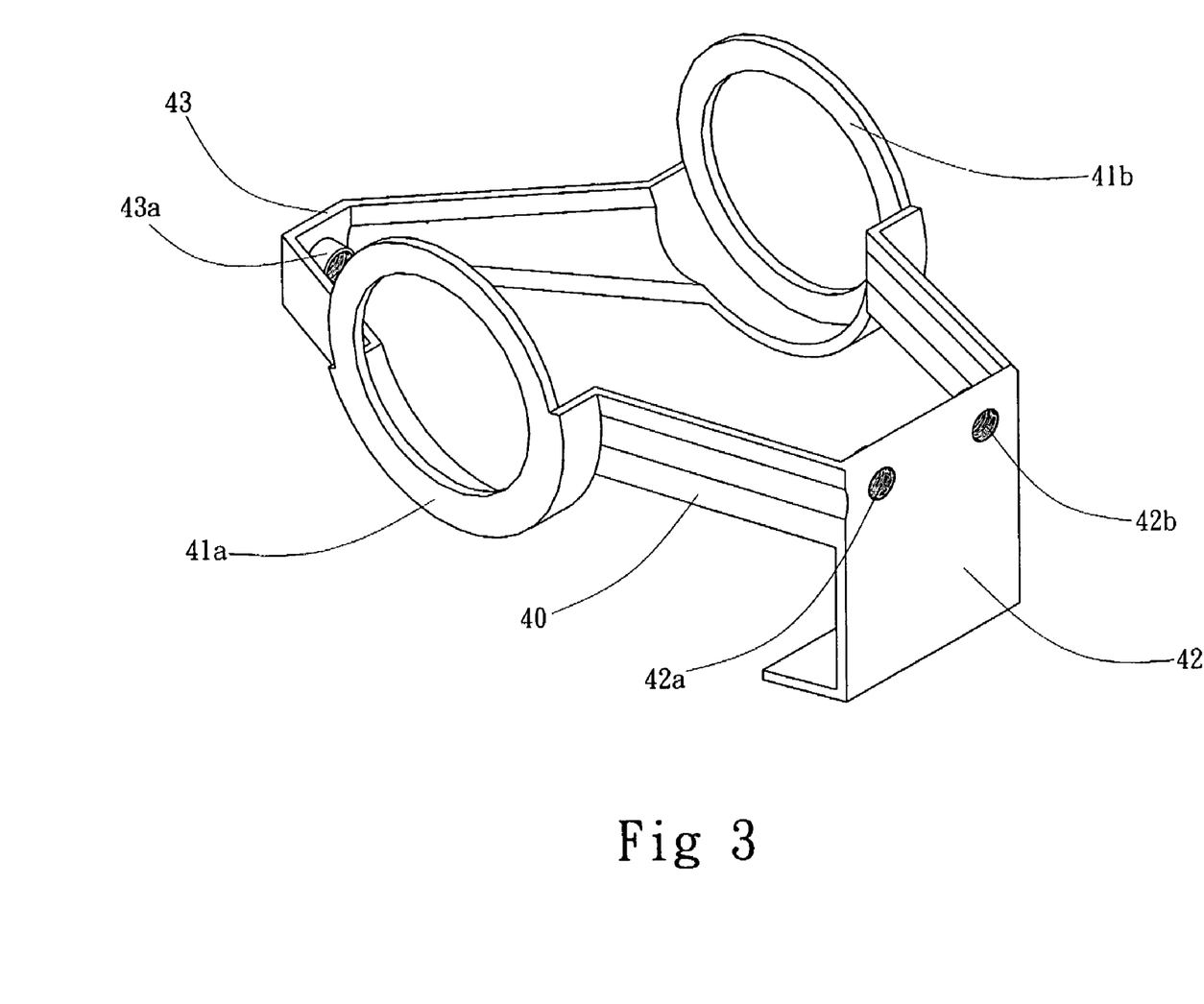
FIG. 3 is a perspective view of a clip bracket of the multipurpose transmission mechanism of the present invention.
Figure 4:
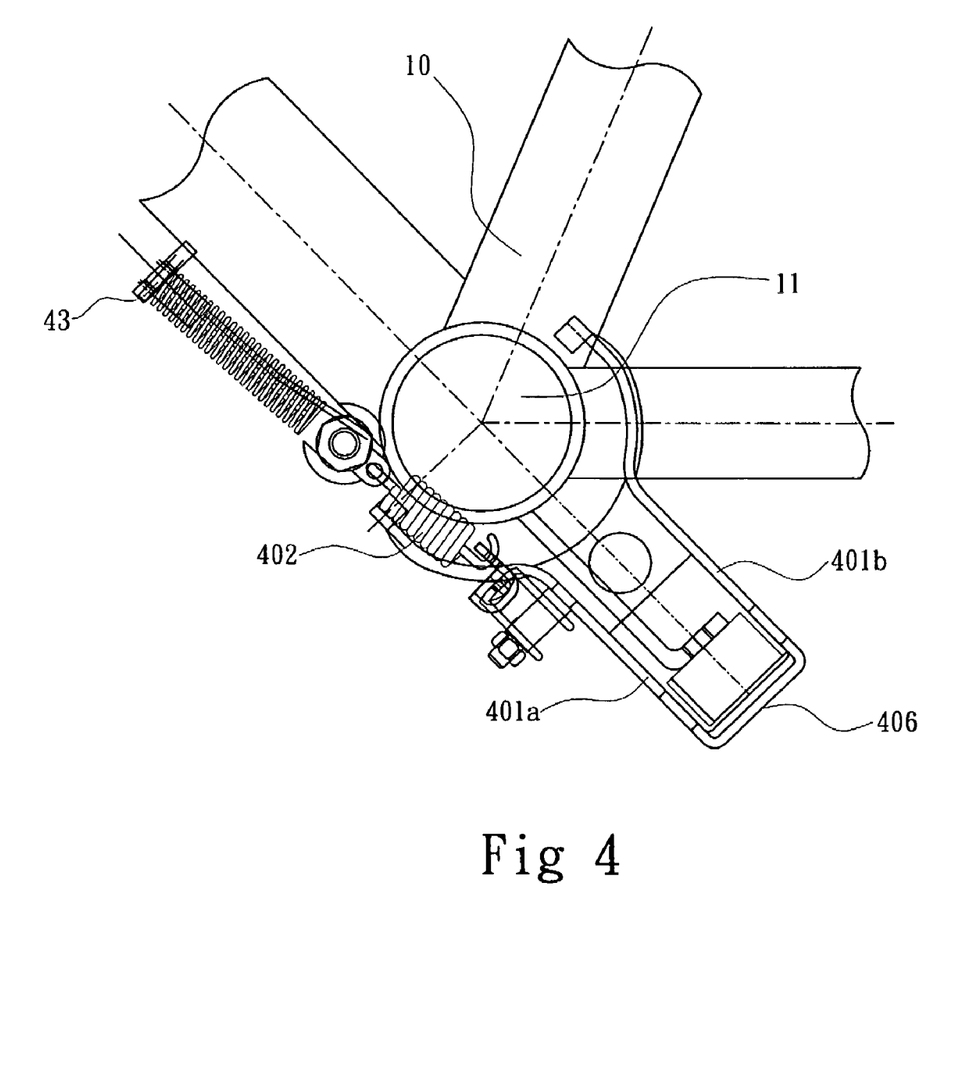
FIG. 4 an enlarged side elevational view of the multipurpose transmission mechanism mounted to a bicycle frame.
Figure 5:
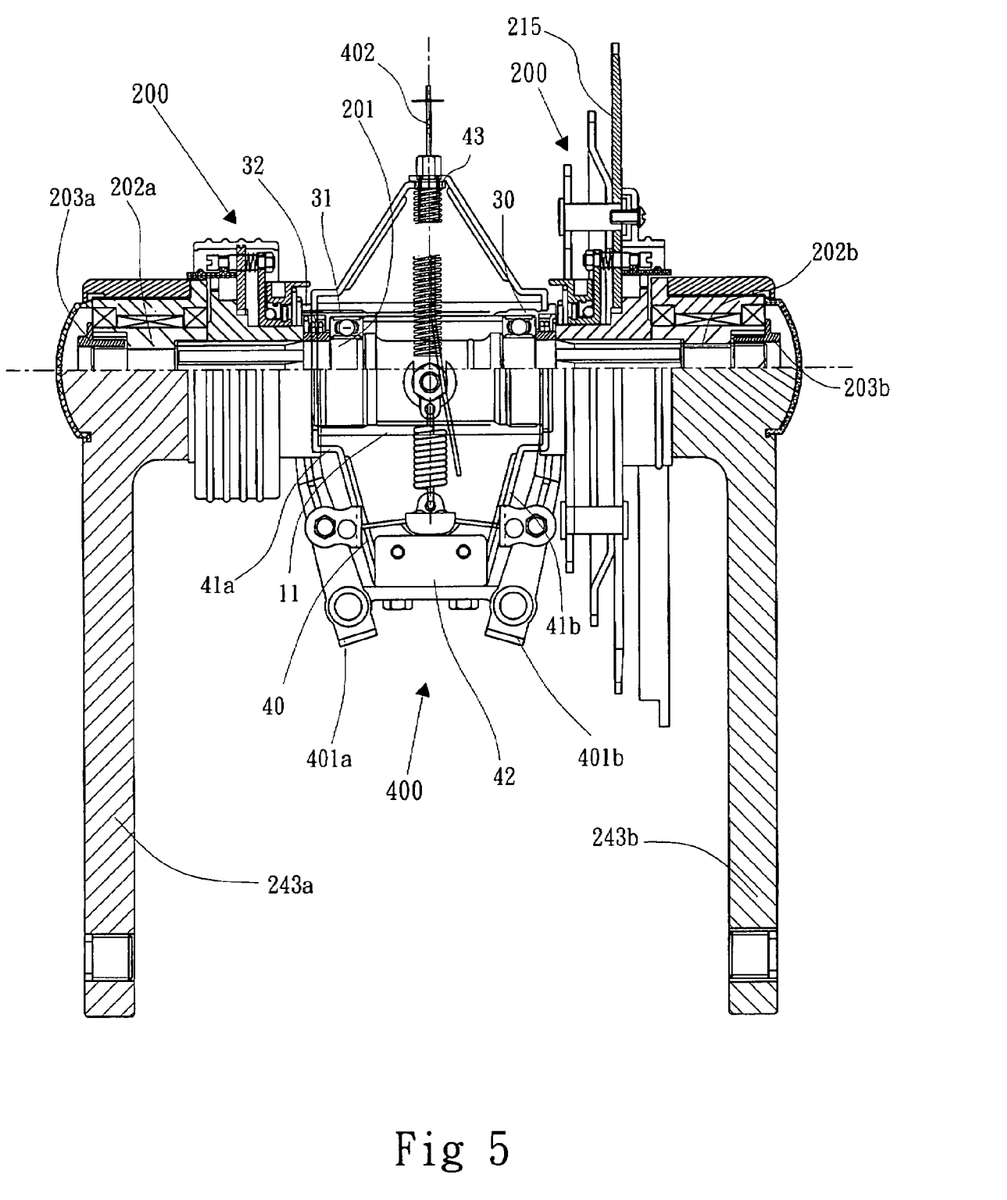
FIG. 5 is a cross-sectional view of the multipurpose transmission mechanism of the present invention mounted to the bicycle frame.

With additional reference to FIG. 3, which shows a perspective view of the clip bracket 40, as well as FIGS. 4 and 5, which are an enlarged side elevational view and a cross-sectional view of the transmission mechanism of the present invention mounted to the bicycle frame, the clip bracket 40 is provided, corresponding to the opposite sides of the lower frame portion 11 of the bicycle frame 10, with the retention rings 41a, 41b, which are positioned in alignment with the opposite ends of the bore of the lower frame portion 11, and are supported by the threaded collars 30, 31 and secured against the lower frame portion 11 by the fixing rings 32, whereby the clip bracket 40 is secured to the lower frame portion 11 of the bicycle frame 10.

The support block 406 of the clips 401a, 401b of the control mechanism 400 is secured by bolts that engages inner-threaded holes 406a, 406b defined in the support block 406 and put in alignment with the inner-threaded holes 42a, 42b of the rear support block 42 of the clip bracket 40. The control cable 402 is then attached to the clips 401a, 401b and thereafter, a front end of the control cable 402 is extended through the inner-threaded hole 43a of the front support block 43 of the clip bracket 40 to allow the control cable 402 to control the operation of the clips 401a, 401b.

Figure 6:
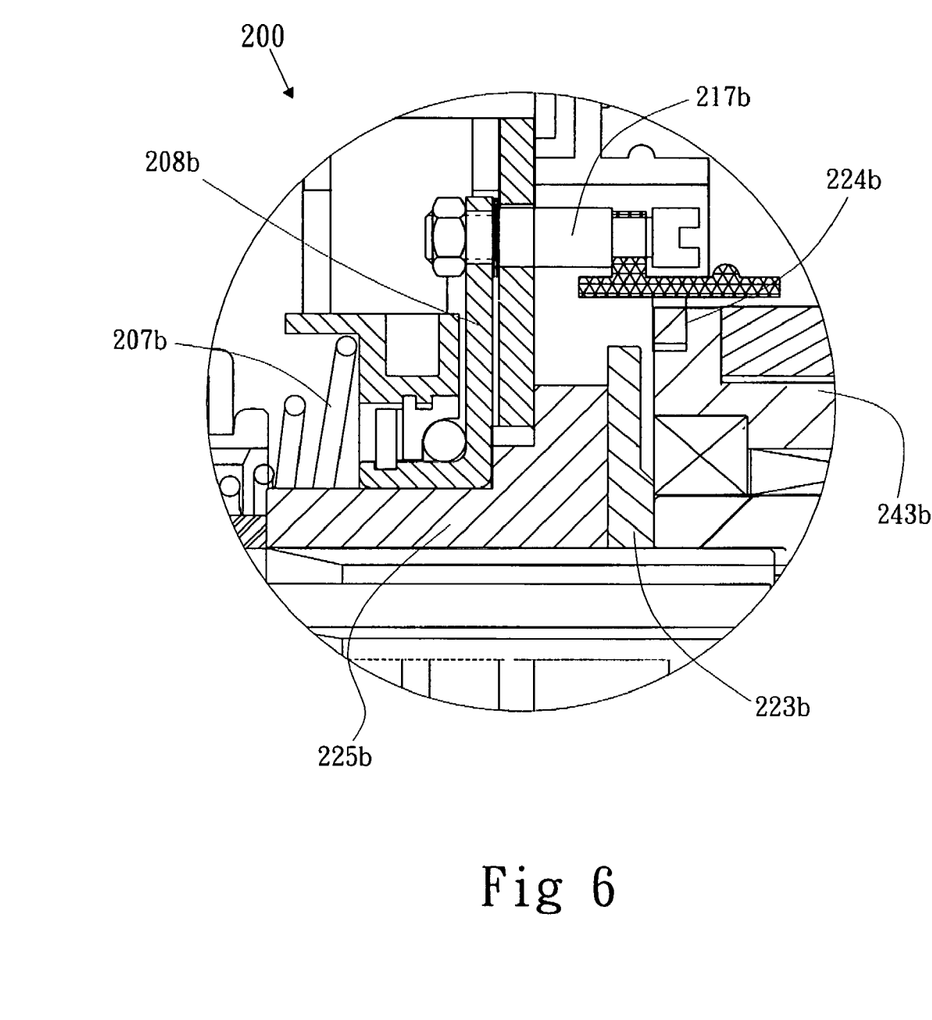
FIG. 6 is an enlarged cross-sectional view of a multi-mode mechanism of the transmission mechanism of the present invention, illustrating an operation thereof.
Figure 6A:
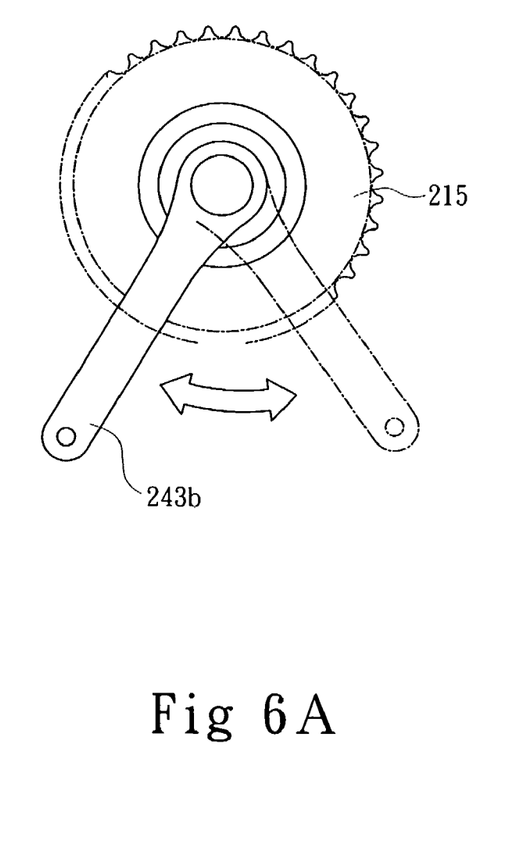
FIG. 6A is a side elevational view illustrating a pedaling mode of the present invention.

Referring to FIGS. 1, 2, and 5, the multi-mode mechanism 200 has a symmetrical arrangement on opposite sides of the central shaft 201, except the driving sprocket means 215 and the gear-shifting means 215a. Only one side of the symmetric arrangement will be explained as an example to describe the present invention, and it is noted that although only reference numerals with a postfix of "b" will be described, counterpart and symmetric reference numerals with a postfix of "a" are of identical construction and operation. The multi-mode mechanism 200 comprises a resilient element 207b (as well as a counterpart and symmetric element 207a on the other side, see FIG. 1), a driving disk 208b, a clutch ring block 224b, a control block 223b, and a connection rod 217b. A controller (not shown) can be mounted at any suitable location on the bicycle frame 10 to be accessed and operated by a user to operate the control cable 402 to for example release the clips 401a, 401b and simultaneously, the resilient element 207b urges the driving disk 208b to move and the clips 401a, 401b are simultaneously moved outward whereby the clutch ring block 224b is forced to abut against a recess formed on a side surface of the pedal crank 243b. The driving disk 208b engages a transmission block 225b. In this condition, the driving power induced by the user's pedaling is transmitted through the pedal crank 243b to drive the driving sprocket means 215, while the power from the other pedal crank 243a is transmitted through the transmission block 225b to drive the driving sprocket means 215 (see FIGS. 5, 6, and 6A). This allows the pedal cranks 243a, 243b to do up and down operation in the same direction for driving a rear wheel through the driving sprocket means 215.

Figure 7:
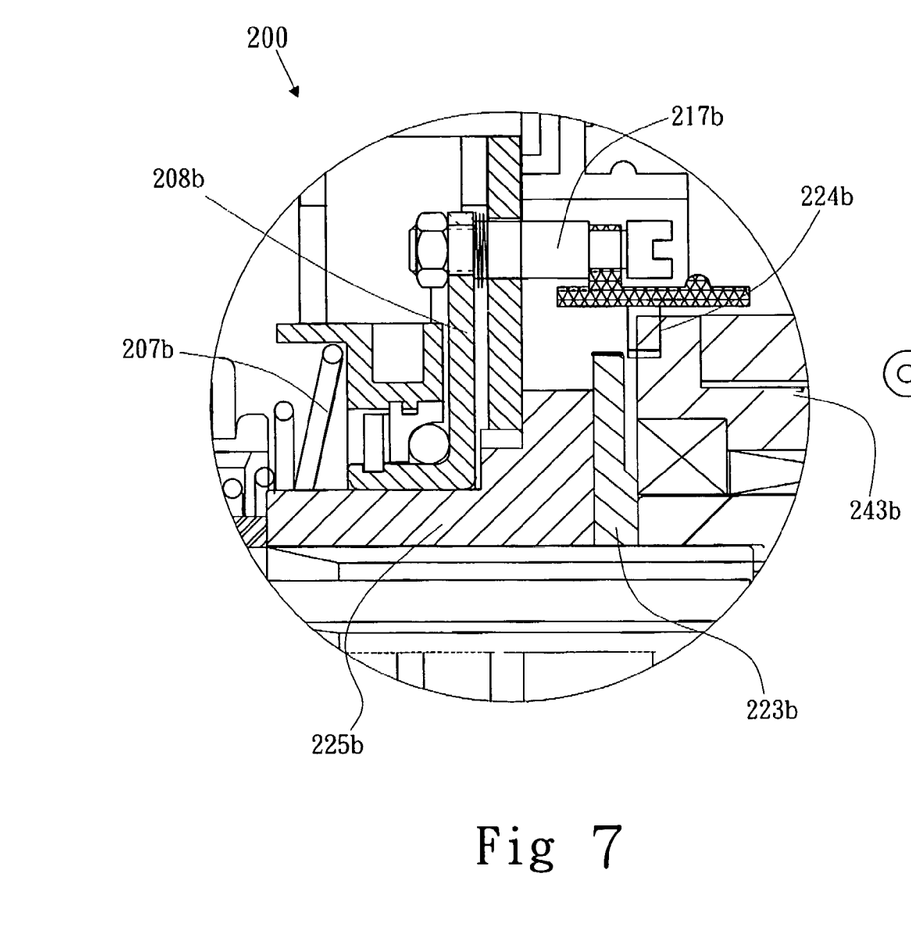
FIG. 7 is an enlarged cross-sectional view of the multi-mode mechanism of the transmission mechanism of the present invention, illustrating another operation thereof.
Figure 7A:
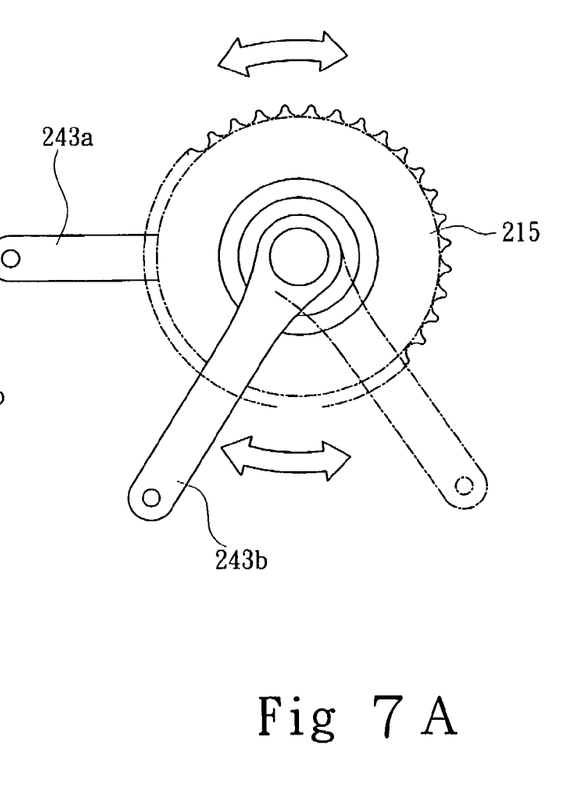
FIG. 7A is a side elevational view illustrating another pedaling mode of the present invention.

Referring to FIGS. 7 and 7A, when the control cable 402 is operated to cause the clips 401a, 401b (see FIG. 5) to control the driving disk 208b to drive the clutch ring block 224b through the connection rod 217b, and making the driving disk 208b displaced away from the transmission block 225b and disengaging from the transmission block 225b, the pedal cranks 243a, 243b are allowed to operate independently. Thus, the pedal cranks 243a, 243b can independently drive the driving sprocket means 215 whereby the driving sprocket means 215 can obtain continuous or intermittent supply of power and the pedal cranks 243a, 243b can be pedaled up and down independently or rotated independently to realize various modes of pedaling operation that transmits power to the rear wheel through the driving sprocket means 215.

Figure 8:
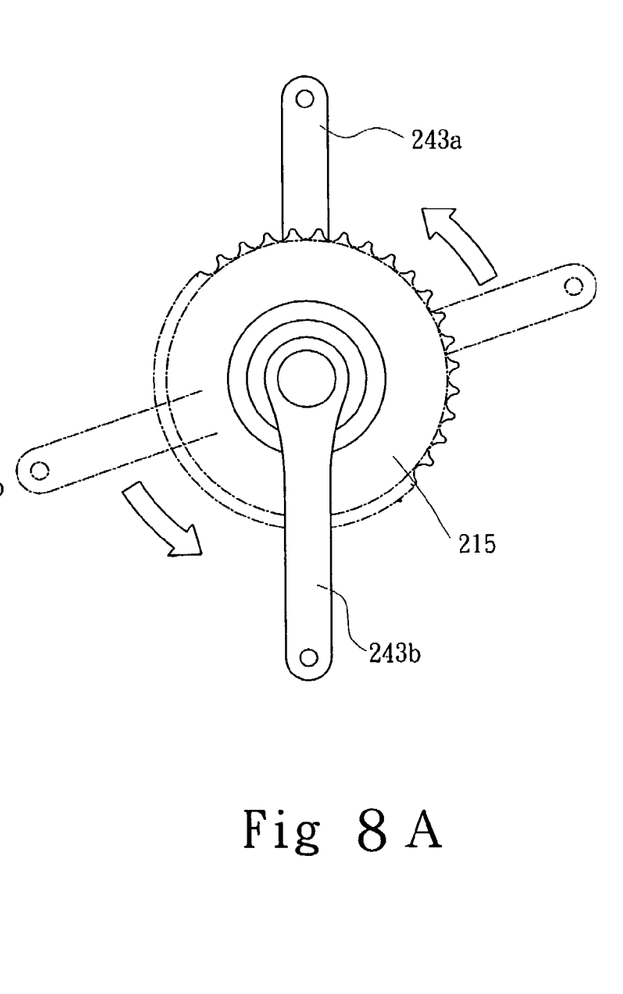
FIG. 8 is an enlarged cross-sectional view of the multi-mode mechanism of the transmission mechanism of the present invention, illustrating a further operation thereof.

Referring to FIGS. 8 and 8A, when the control cable 402 drives the clips 401a, 401b to control the driving disk 208b and the connection rod 217b to engage the clutch ring block 224b with the control block 223b, the pedal cranks 243a, 243b are switched to a regular opposite-positioned condition whereby the pedal cranks 243a, 243b can be pedaled alternatively to rotate continuously for supplying power to the driving sprocket means 215, which is then transmitted to the rear wheel.

To summarize, the present invention offers the following advantages:

(1) The first advantage of the present invention is that a conventional and regular bicycle frame can be used to combine with the central shaft and the threaded collars of the quick assembly device to mount a clip bracket thereon so that no specific-purpose bicycle frame is needed in coupling the multi-mode mechanism to the regular bicycle frame. Thus, the construction is simplified and the assembling is made easy, both facilitating popularization of bicycle products of the present invention and enhancing economic values of the bicycle.

(2) The second advantage of the present invention is that the transmission mechanism of the present invention can be easily mounted to a regular bicycle frame by the general consumers, which facilitates popularization. In addition, the bicycle of the present invention can be of various modes of pedaling, which enhances pleasure of riding and appealing to the general consumers.

(3) The third advantage of the present invention is that the quick assembly device of the present invention can also work with a stationary bicycle, providing the stationary bicycle with different modes of pedaling so that a user may select different mode of pedaling depending upon the user's mood and desire. In addition, the various modes of pedaling provided by the present invention also allows a user of the stationary bicycle to carry out training and exercising of different muscles of the user.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A transmission mechanism for a bicycle having a frame in which a bore is defined, the transmission mechanism comprising:
a quick assembly device comprising a central shaft, which extends through the bore of the bicycle frame; threaded collars, which are respectively mounted to opposite end openings of the bore to rotatably support the central shaft in the bore; a clip bracket, which comprises two retention rings respectively located outside the end openings of the bore and fixedly mounted to the threaded collars; and at least one clip that is mounted to the clip bracket to be movable between a first position and a second position; and
a multi-mode mechanism, which is supported and fixed by the quick assembly device and in operative coupling with the clip in order to switch the bicycle among multiple modes of pedaling according to the switching of the clip between the first and second positions;
wherein the clip bracket comprises downward extensions from the retention rings and a rear support block mounted between the downward extensions, the clip being movably mounted to the rear support block: and
wherein the clip is rotatably mounted to a first support block, the first support block being mounted to the rear support block of the clip bracket.

2. The transmission mechanism as claimed in claim 1, wherein the threaded collars comprise bearings accommodated therein for rotatably supporting the central shaft.

3. The transmission mechanism as claimed in claim 1, wherein the support block defines threaded holes respectively in alignment with and fixed to threaded holes defined in the rear support block through fasteners.

4. The transmission mechanism as claimed in claim 1, wherein the multi-mode mechanism comprises resilient elements, driving disks, connection rods, clutch ring blocks, control blocks, and transmission blocks, which are arranged in a symmetric manner on opposite ends of the central shaft and wherein the switching of the clip between the first and second position switches the clutch ring blocks between a first condition of selectively engaging pedal cranks of the bicycle and the control blocks and a second condition of engaging the pedal cranks and the transmission blocks.

5. The transmission mechanism as claimed in claim 1, wherein the threaded collars are received and fixed in the opposite end openings of the bore of the bicycle frame through threading engagement.

6. The transmission mechanism as claimed in claim 1, further comprising a fixing ring fit over and in threading engagement with one of the threaded collars to secure the clip bracket to the bicycle frame.

7. The transmission mechanism as claimed in claim 1, wherein the clip bracket comprises upward extensions respectively extending from the retention rings and a front support block mounted between the upward extensions, a hole being defined in the front support block, a control cable having an end coupled to the hole defined in the front support block and an opposite end forming a branch coupled to the clip, the control cable being adapted to be operated by a user to switch the clip between the first and second positions.

8. The transmission mechanism as claimed in claim 7, wherein two clips are movably mounted to the clip bracket, the control cable having two branches respectively coupled to the clips to simultaneously switch the clips between the first and second positions.

* * * * *